(12) United States Patent
Ebrahim et al.

(10) Patent No.: US 11,025,530 B1
(45) Date of Patent: Jun. 1, 2021

(54) INTELLIGENT ROUTING OF MESSAGES THROUGH COMMUNICATION CHANNELS

(71) Applicant: International Business Machines Corporation, Armonk, NY (US)

(72) Inventors: Nasser Ebrahim, Bengaluru (IN); Thanuja Tankasala, Bengaluru (IN); Sai Kanduri, Bangalore (IN); Gayathri Bhaskaran, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/739,639

(22) Filed: Jan. 10, 2020

(51) Int. Cl.
*H04L 12/58* (2006.01)
*H04L 12/707* (2013.01)
*H04L 29/08* (2006.01)
*H04L 12/26* (2006.01)

(52) U.S. Cl.
CPC .......... *H04L 45/22* (2013.01); *H04L 43/0876* (2013.01); *H04L 51/04* (2013.01); *H04L 51/24* (2013.01); *H04L 51/30* (2013.01); *H04L 51/36* (2013.01); *H04L 67/02* (2013.01); *H04L 67/26* (2013.01)

(58) Field of Classification Search
CPC ......... H04L 51/36; H04L 51/30; H04L 63/08; H04W 4/12
See application file for complete search history.

(56) References Cited

U.S. PATENT DOCUMENTS

| | | | |
|---|---|---|---|
| 6,618,710 B1 | 9/2003 | Zondervan | |
| 7,065,184 B2 | 6/2006 | Vishik | |
| 7,269,627 B2 | 9/2007 | Knauerhase | |
| 8,095,605 B2 | 1/2012 | Vishik | |
| 8,948,356 B2 | 2/2015 | Nowack | |
| 9,992,033 B2 | 6/2018 | Eisenberg | |
| 2010/0115035 A1* | 5/2010 | Malhar | H04L 51/36 709/206 |
| 2015/0304827 A1 | 10/2015 | Price | |
| 2017/0017351 A1 | 1/2017 | Singh | |
| 2018/0097756 A1* | 4/2018 | Lew | H04L 51/30 |

FOREIGN PATENT DOCUMENTS

EP 1676399 B1 3/2016

\* cited by examiner

*Primary Examiner* — Kyung H Shin
(74) *Attorney, Agent, or Firm* — Daniel R. Simek

(57) ABSTRACT

Aspects of the present invention disclose a method, computer program product, and system for routing a message to a communication channel based on utilization data. The method includes one or more processors receiving a message for distribution to a user. The method further includes one or more processors identifying historical communication channel utilization data associated with the user. The method further includes one or more processors determining a prediction of an active communication channel for the user based on the historical communication channel utilization data associated with the user. The method further includes one or more processors determining whether to reroute the message to the predicted active communication channel of the user. The method further includes, in response to determining to reroute the message to the predicted active communication channel, one or more processors sending the message to the user utilizing the predicted active communication channel.

20 Claims, 4 Drawing Sheets

INTELLIGENT ROUTING OF MESSAGES THROUGH COMMUNICATION CHANNELS

BACKGROUND OF THE INVENTION

The present invention relates generally to the field of content distribution, and more particularly to distribution of messages and notifications.

Internet-based messaging and communication is available over a wide variety of communication channels, such as different applications (e.g., instant messaging application, social media application, voice communications, image messaging, video messaging, etc.) and messaging protocols. In addition, Internet-based messaging and communication can occur over a variety of communication channels, such as user-to-user communication, client-to-client communication, client-to-server communication, server-to-client communication, server-to-server communication, etc. For example, an end-user of a messaging application can send an Internet-based message to another end-user of the messaging application.

A push notification is Internet-based communication where delivery of information proceeds from a software application server to a client computing device without a specific request from the client computing device. A push notification is a message that is "pushed" from a backend server or application to user interface (e.g., mobile applications, desktop applications, etc.).

Push notifications are mainly divided into two approaches, local notifications and remote notifications. For local notifications, the application schedules the notification with the local device's operating system (OS), or, alternatively, sets as a timer in the application itself if it is able to continuously run in the background. When the event's scheduled time is reached, or the event's programmed condition is met, the message is displayed in the application's user interface. Remote notifications are handled by a remote server. Under this scenario, the client application is registered on the server with a unique key (e.g., a universally unique identifier (UUID)). The server delivers the message against the unique key to deliver the message to the client application via an agreed client/server protocol (e.g., Hypertext Transfer Protocol (HTTP) or Extensible Messaging and Presence Protocol (XMPP)) and the client displays the message received. When the push notification arrives, it can transmit short notifications and messages, set badges on application icons or play alert sounds to attract user's attention.

SUMMARY

Aspects of the present invention disclose a method, computer program product, and system for routing a message to a communication channel based on utilization data. The method includes one or more processors receiving a message for distribution to a user. The method further includes one or more processors identifying historical communication channel utilization data associated with the user. The method further includes one or more processors determining a prediction of an active communication channel for the user based on the historical communication channel utilization data associated with the user. The method further includes one or more processors determining whether to reroute the message to the predicted active communication channel of the user. The method further includes, in response to determining to reroute the message to the predicted active communication channel of the user, one or more processors sending the message to the user utilizing the predicted active communication channel of the user.

DETAILED DESCRIPTION

Embodiments of the present invention allow for determining a prediction of an active communication channel for a recipient user of message. For example, embodiments of the present invention can determine a prediction of a communication channel that a user will be accessing next (i.e., a next accessing communication channel). In addition, embodiments of the present invention operate to route a message (e.g., a push notification, voice communication, text communication, etc.) to the predicted communication channel.

Another embodiment of the present invention provides a message recipient with a mechanism to block a spam message sender from sending a message via all communication channels associated with the message recipient. An additional embodiment of the present invention can provide a notification via the predicted communication channel to a message recipient (e.g., based on a sender preference). Further embodiments of the present invention convert a message to a format that is compatible with the predicted communication channel (e.g., convert a voice communication to a text communication, etc.). Accordingly, embodiments of the present invention provide an intelligent routing system to ensure that a message or notification is delivered to a recipient in an expedited manner, while also providing the capability to block unwanted spam communications.

Some embodiments of the present invention recognize that users of computing devices utilize multiple different communication channels (e.g., applications) to communicate with each other (e.g., voice communication, social media, etc.). Many users have preferred communication channels that can vary based on changing situations, such as time, location, activity, etc. Embodiments of the present invention recognize that an intelligent routing of a message to an active, or soon-to-be active communication channel for a user can be very beneficial in many situations, such as transmission of urgent messages. Additional embodiments of the present invention recognize that spam messaging utilizes a high amount of network bandwidth and that providing a centralized system to block spam messaging will reduce unwanted and unnecessary network and resource utilization, while greatly improving user experience.

Accordingly, embodiments of the present invention operate to ensure delivery of a message (e.g., push notification) to a user through a communication channel that the user is accessing, or will be accessing, instead of an inactive communication channel. Further, embodiments of the present invention provide advantages of reducing extraneous network bandwidth usage and system computational resources for sending messages to an inactive channel or duplicate messages and also on the client-side for receiving and processing messages and notifications.

Implementation of embodiments of the invention may take a variety of forms, and exemplary implementation details are discussed subsequently with reference to the Figures.

Figure 1:
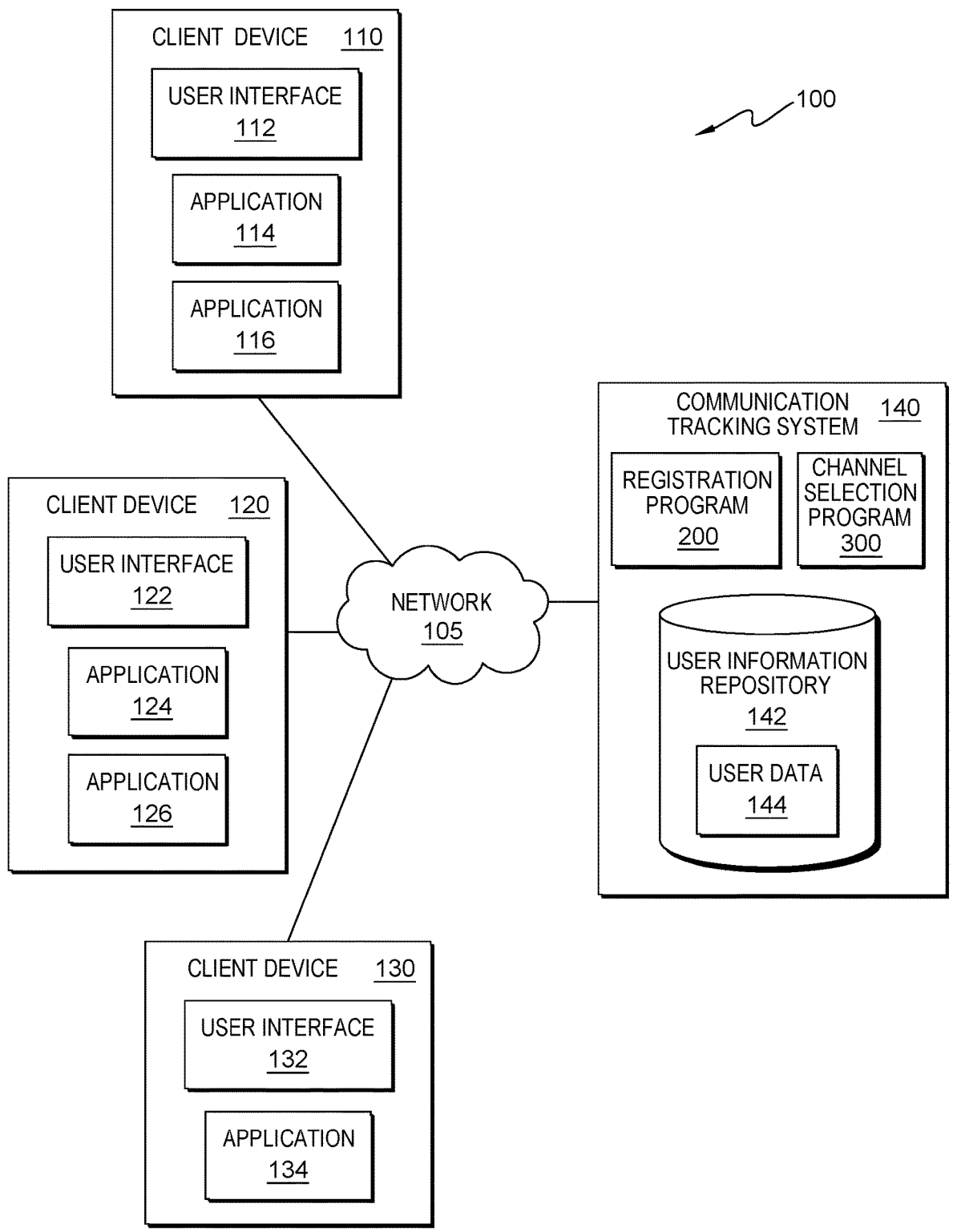
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 110, client device 120, client device 130, and communication tracking system 140, all interconnected over network 105. In an example embodiment, client device 110 and client device 120 are representative of multiple computing devices that are associated with a user and client device 130 is associated with a different user or entity. For example, a user of client device 130 sends a message, via communication tracking system 140, to the user associated with client device 110 and client device 120. In this example, communication tracking system 140 manages routing of the message to the user, in accordance with embodiments of the present invention.

Network 105 can be, for example, a local area network (LAN), a telecommunications network, a wide area network (WAN), such as the Internet, or any combination of the three, and include wired, wireless, or fiber optic connections. In general, network 105 can be any combination of connections and protocols that will support communications between client device 110, client device 120, client device 130, and communication tracking system 140, in accordance with embodiments of the present invention. In various embodiments, network 105 facilitates communication among a plurality of networked computing devices (e.g., client device 110, client device 120, client device 130, and communication tracking system 140), corresponding users (e.g., respective individuals client device 110, client device 120, and client device 130), and corresponding management services (e.g., communication tracking system 140).

In various embodiments of the present invention, client device 110, client device 120, and client device 130 may be a workstation, personal computer, personal digital assistant, mobile phone, or any other device capable of executing computer readable program instructions, in accordance with embodiments of the present invention. In general, client device 110, client device 120, and client device 130 are representative of any electronic device or combination of electronic devices capable of executing computer readable program instructions. Client device 110, client device 120, and client device 130 may include components as depicted and described in further detail with respect to FIG. 4, in accordance with embodiments of the present invention. In an example embodiment, client device 110 and client device 120 are computing devices associated with (e.g., registered to) a common user and client device 130 is a computing device associated with a different user or entity (e.g., a user sending a message, a messaging service, etc.).

Client device 110 includes user interface 112, application 114, and application 116. User interface 112 is a program that provides an interface between a user of client device 110 and a plurality of applications that reside on the device (e.g., application 114 and application 116). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API).

Application 114 and application 116 can each be representative of one or more applications (e.g., an application suite) that operate on computing device 110. In various example embodiments, application 114 and application 116 can be applications that include a respective communication channel for a user utilizing client device 110. For example, application 114 is a text messaging application and application 116 is a social media application that includes messaging capabilities.

In an example embodiment, a user of client device 110 can receive messages and notifications (e.g., text messages, voice communications, push notifications, etc.) via application 114 and application 116. In such example embodiments, the user of client device 110 can interact with received messages and notifications utilizing user interface 112. In various embodiments of the present invention, a communication channel can be based on utilizing a particular device (e.g., communicating via client device 110 as a communication channel) or utilizing a particular application or service (e.g., communicating via application 116 on client device 110 as a communication channel). In other aspects of the present invention, application 114 can also be representative of one or more applications that provide additional functionality to client device 110 (e.g., camera, messaging, etc.), in accordance with various aspects of the present invention.

In addition, client device 120 and client device 130 include respective instances of user interface 122, application 124, application 126, user interface 132, and application 134. The respective instances of user interface 122, application 124, application 126, user interface 132, and application 134 include functionality as described above, with regard to respective instances of user interface 112, application 114, and application 116. In example embodiments, client device 110 and client device 120 are registered to a user. In such example embodiments, the user can communicate over network 150 utilizing a plurality of communication channels, which include client device 110, application 114, application 116, client device 120, application 124, and application 126, in accordance with various embodiments of the present invention.

In another example embodiment, client device 130 is associated with (e.g., registered to) a user that sends (over network 105) a message or notification to the user associated with client device 110 and client device 120. In an example scenario, the user associated with client device 130 is a messaging service for an enterprise, such as a service for distributing push notification associated with a company or service.

In example embodiments, communication tracking system 140 can be a desktop computer, a computer server, or any other computer systems, known in the art. In certain embodiments, communication tracking system 140 represents computer systems utilizing clustered computers and components (e.g., database server computers, application server computers, etc.) that act as a single pool of seamless resources when accessed by elements of data processing environment 100 (e.g., client device 110, client device 120, and client device 130). In general, communication tracking system 140 is representative of any electronic device or combination of electronic devices capable of executing computer readable program instructions. Communication tracking system 140 may include components as depicted and described in further detail with respect to FIG. 4, in accordance with embodiments of the present invention.

Communication tracking system 140 includes registration program 200, channel selection program 300, and user information repository 143, which includes user data 144. In various embodiments of the present invention, communication tracking system 140 operates as a centralized system to process and route messages (e.g., utilizing channel selection program 300) for registered user (e.g., the user of client device 110 and client device 120). In an example embodiment, communication tracking system 140 is associated with service providing entity (e.g., a messaging enterprise or service, a mobile service provider, a consortium of mobile service provider, a regulatory service, etc.). In another example embodiment, communication tracking system 140 provides users with the capability to specify a preference block all messages (e.g., spam message communications) from a particular sender (i.e., message origination location or identifier) on one or more communication channels associated with the user.

In example embodiments, registration program 200 registers and authenticates a communication channel for a user, in accordance with an embodiment of the present invention. In various embodiments, registration program 200 manages requests to register a communication channel with communication tracking system 140 for a user. In response to validating an authentication of a user (e.g., utilizing a one-time passcode) and a communication channel, registration program 200 can add the communication channel to a listing of registered communication channels for the user (e.g., in a respective instance of user data 144 for the user).

In additional example embodiments, channel selection program 300 determines an active communication channel (e.g., a next accessing communication channel) for a user, in accordance with an embodiment of the present invention. In various embodiments, channel selection program 300 receives a message (e.g., from a user of client device 130) for distribution to a user (e.g., a user associated with client device 110 and client device 120) and determines a prediction of an active communication channel of the user for distribution of the message, based on channel utilization data associated with the user. Accordingly, channel selection program 300 can reroute the message to the predicted active communication channel for the user and provide a notification to the sender regarding the rerouted communication, in accordance with various embodiments of the present invention.

In example embodiments, communication tracking system 140 utilizes user information repository 142 to store information associated with registered users (e.g., of communication tracking system 140, or an enterprise or service managed by communication tracking system 140). In additional embodiments, communication tracking system 140 utilizes user information repository to store corresponding interactions of users with registered devices (e.g., client device 110 and client device 120) and registered communication channels (e.g., application 114, application 116, application 124, and application 126). In various embodiments, user information repository 142 includes information that registration program 200 and channel selection program 300 can access and utilize, in accordance with embodiments of the present invention. In further embodiments, user information repository 142 includes information associated with user's registered with communication tracking system 140, or a service managed by communication tracking system 140 (e.g., respective instances of user data 144 for each registered user).

User information repository 142 can be implemented with any type of storage device, for example, persistent storage 405, which is capable of storing data that may be accessed and utilized by communication tracking system 140, client device 110, client device 120, and client device 130, such as a database server, a hard disk drive, or a flash memory. In other embodiments, user information repository 142 can represent multiple storage devices and collections of data within communication tracking system 140.

In various embodiments of the present invention, the user of client device 110 and client device 120 registers with communication tracking system 140 (e.g., via a corresponding application, such as registration program 200). In another embodiment, the user of client device 130 also registers with communication tracking system 140 (e.g., via a corresponding application such as registration program 200). For example, the user completes a registration process, provides information, and authorizes the collection and analysis (i.e., opts-in) of relevant data on at identified computing devices, (e.g., client device 110, client device 120, and client device 130), by communication tracking system 140 (e.g., via channel selection program 300). In various embodiments, a user can opt-in or opt-out of certain categories of data collection. For example, the user can opt-in to provide all requested information, a subset of requested information, or no information. In one example scenario, the user opts-in to provide time-based information, but opts-out of providing location-based information (on all or a subset of client device 110, client device 120, and client device 130).

In another embodiment, during a registration process of a user of communication tracking system 140, the user can define to block some, or all, messages that are associated with a particular sender. For example, a user registers with communication tracking system 140 and defines to block all messages from a particular sender, based on a message origination location or identifier, that is known to send spam messages. In addition, a user of communication tracking system 140 can redefine preferences, after initial registration, to block messages from a particular user or originating location. In a further embodiment, a user of communication tracking system 140 can also define to block messages on one or more "or all) registered communication channels for the user.

In example embodiments, user data 144 is representative of aggregated data, stored within user information repository 142. In an example scenario, user data 144 includes information associated with the user registered to client device 110 and client device 120. In various embodiments, user data 144 can include a plurality of information sets associated with a particular user, such as registered computing devices and corresponding information, device identification information, validation/authentication information, notification/messaging preferences and interaction information, time-based interaction information, data usage preferences, and other information relevant to a user receiving push notifications and messages on computing devices.

In another example embodiment, user data 144 includes information associated with a user interaction with registered communication channels and computing devices that include the registered computing channels (e.g., application 116 on client device 110), such as aggregated communication channel and device usage information. In addition, user data 144 can include aggregated information associated with a user receiving notifications and messages, such as sent time, a read time, interaction (e.g., user selection) time, indication of dismissal, device status information (e.g., device on or off, device power level, etc.), device ability to receive push notifications or messages (enabled/disabled), etc.

In an example scenario, the user associated with client device 110 and client device 120 registers (e.g., via registration program 200) the respective communication channels associated with client device 110, application 114, application 116, client device 120, application 124, and application 126 with communication tracking system 140. Accordingly, communication tracking system 140 registers and adds the communication channels to a respective instance of user data 144 with a respective unique identifier. In another embodiment, each registered communication channel pushes utilization information to communication tracking system 140, for storage in user data 144.

In additional embodiments, communication tracking system 140 aggregates communication channel usage data for the user and stores the aggregated data in user data 144 (i.e., user data 144 includes historical usage data associated with communication channels). For example, user data 144 includes historical usage data indicating that the user of client device 110 and client device 120 actively utilizes application 114 on client device 110 to send and receive messages on weekdays from 9:00 AM to 6:00 PM, actively utilizes application 125 on client device 120 to send and receive messages on weekdays after 6:00 PM, etc.

Figure 2:
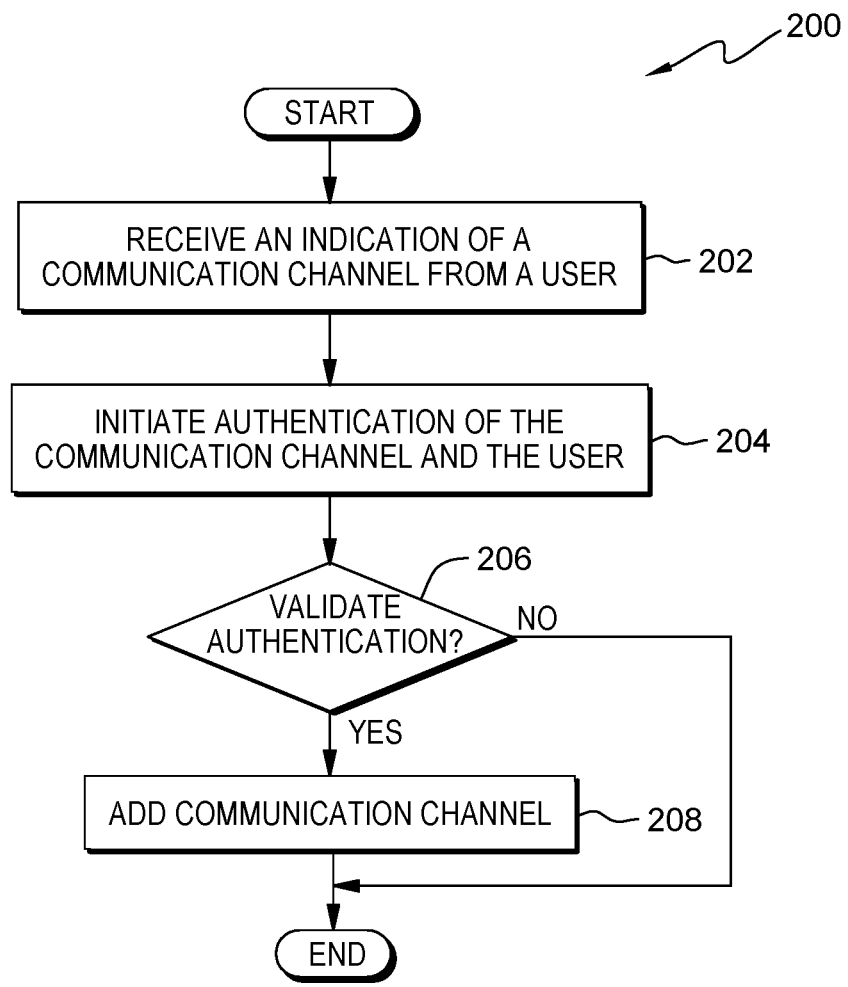
FIG. 2 is a flowchart depicting operational steps of a program for registering and authenticating a communication channel for a user, in accordance with an embodiment of the present invention.

FIG. 2 is a flowchart depicting operational steps of registration program 200, a program for registering and authenticating a communication channel for a user, in accordance with an embodiment of the present invention. In one embodiment, registration program 200 initiates in response to communication tracking system 140 receiving a request to add/register a communication channel.

In step 202, registration program 200 receives an indication of a communication channel from a user. In one embodiment, the user associated with client device 110 and client device 120 requests register a new communication channel with communication tracking system 140, such as a device, application, etc. For example, the user of client device 120 provides input (via user interface 122) requesting to add application 126 (e.g., a text messaging application) as a communicate channel associated with the user for communication tracking system 140. In various embodiments of the present invention, during registration, the user can indicate data sources that the user authorizes and does not authorize (e.g., opt-in and out-out) communication tracking system 140 to access and utilize.

In step 204, registration program 200 initiates authentication of the communication channel and the user. In one embodiment, registration program 200 initiates an authentication to validate whether the user requesting to register the communication channel is authorized. For example, registration program 200 authenticates whether a user is registering a communication channel (e.g., device, messaging application, etc.) that the user has access. In example embodiments, registration program 200 initiates a one-time password (OTP) authentication to the indicated communication channel (of step 202). In additional embodiments, registration program 200 can utilize additional processes to authenticate a user and a communication channel.

In one example scenario, a user is requesting to register client device 110 (indicated in step 202), which is a smartphone. In this scenario, registration program 200 sends a one-time pass code to client device 110, utilizing the mobile phone number of client device 110 (provided by the user) to initiate authentication. In another example scenario, a user is requesting to register application 124 on client device 120 (indicated in step 202), which is a text messaging application. In this scenario, registration program 200 sends a one-time pass code to an account for application 126 that is associated with the user to initiate authentication (e.g., the user provides a username when requesting to register a communication channel with communications tracking system 140).

In decision step 206, registration program 200 determines whether the authentication process validates registering the communication channel. In one embodiment, registration program 200 determines whether the user has provided the one-time passcode sent in step 204. In various embodiments, registration program 200 waits a defined amount of time (e.g., fifteen minutes) for the user to input the sent one-time passcode (i.e., a time-restricted passcode). In response to determining that the authentication process does not validate (i.e., authentication fails) the registration (decision step 206, NO branch), registration program 200 ends. In another embodiment, in response to determining that the authentication process does not validate (i.e., authentication fails) the registration (decision step 206, NO branch), registration program 200 notifies the requesting user and ends.

In step 208, registration program 200 adds the communication channel. More specifically, in response to determining that the authentication process validates (i.e., authentication passes) the registration of the communication channel (decision step 206, YES branch), registration program 200 adds the communication channel to user data 144 associated with the user. Accordingly, upon adding the communication channel to user data 144 for the user, communication tracking system 140 can utilize the communication channel in accordance with various embodiments of the present invention (e.g., channel selection program 200).

Figure 3:
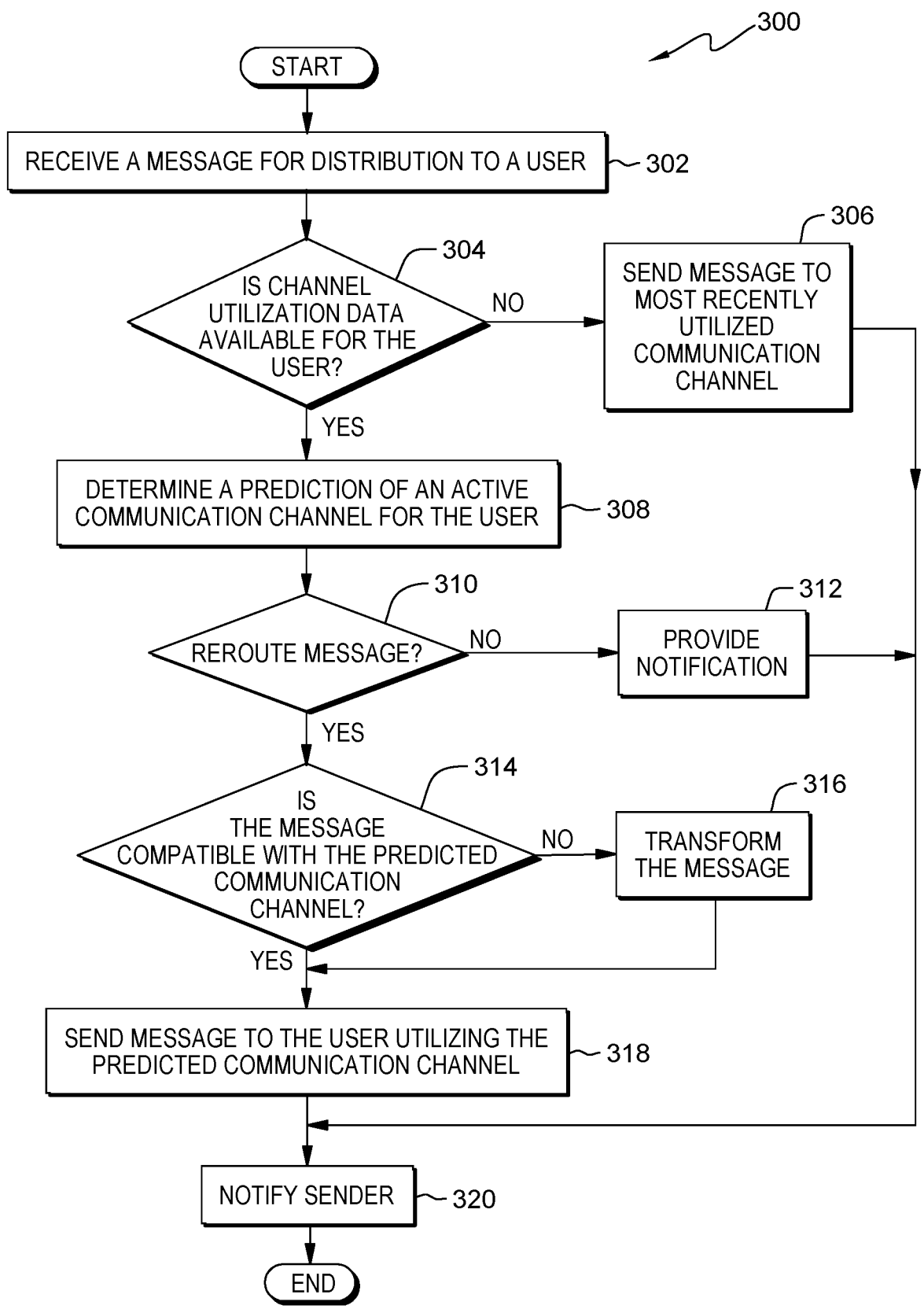
FIG. 3 is a flowchart depicting operational steps of a program for routing a message to a communication channel, in accordance with an embodiment of the present invention.

FIG. 3 is a flowchart depicting operational steps of channel selection program 300, a program for routing a message to a communication channel, in accordance with an embodiment of the present invention. In one embodiment, channel selection program 300 initiates in response to receiving a message to send to a registered user of communication tracking system 140. In another embodiment, channel selection program 300 initiates at a scheduled time to distribute a message to one or more registered users of communication tracking system 140 or a corresponding service or enterprise.

In step 302, channel selection program 300 receives a message for distribution to a user. In one embodiment, channel selection program 300 receives a message for distribution to a registered user of communication tracking system 140. For example, a user of client device 130 sends communication tracking system 140 (or a corresponding service/enterprise) a message for distribution to the user registered to client device 110 and client device 120 (i.e., the recipient user). In various embodiments, the sending user can indicate a communication channel for communication tracking system 140 to utilize to send the message to the user. For example, the sending user indicates to send the message utilizing application 114. In another example, the sending user indicates to send the message to client device 120 (e.g., client device 120 as the communication channel).

In another embodiment, channel selection program 300 receives a push notification (e.g., from an application or service) for distribution. In such embodiments, the push notification is for a particular communication channel, such as application 114. In additional embodiments, the sending user can also specify preferences for distribution of the message (e.g., allowed communication channels, an indication to not reroute the message, confirmation preferences, etc.).

In step 304, channel selection program 300 determines whether channel utilization data is available for the user. In one embodiment, channel selection program 300 determines whether user information repository 142 includes communication channel utilization data (e.g., in user data 144) associated with the intended recipient user of the message (received in step 202). In another embodiment, channel selection program 300 determines whether user information repository 142 includes enough data to predict an active communication channel for the recipient user to receive the message. In various embodiments of the present invention, communication channel utilization data (in user data 144) associated with a recipient user includes data indicating historical communication channel usage (e.g., usage time, derived usage patterns, channel preferences, etc.).

In an example embodiment, channel selection program 300 determines whether user data 144 associated with the recipient user includes communication channel utilization data that corresponds to a distribution time of the message. For example, channel selection program 300 receives (in step 302) a message for distribution on Tuesday at 8:00 PM. In this example, channel selection program 300 determines whether user data 144 for the message recipient includes a threshold amount of communication channel utilization data (e.g., a minimum number of data entries) for a timeframe similar to the distribution time of the message (e.g., Tuesday evening).

In step 306, channel selection program 300 sends the message to the most recently accessed communication channel. More specifically, in response to determining that user information repository 142 does not include channel utilization data available for the recipient user (decision step 304, NO branch), channel selection program 300 sends the message to the last-accessed communication channel by the recipient user. In an example embodiment, channel selection program 300 determines a last access time for each communication channel registered to the recipient user (e.g., based on an analysis of user data 144).

For example, in response to determining that user data 144 associated with the recipient user does not include communication channel utilization data for a timeframe similar to the distribution time of the message, channel selection program 300 identifies a most recently utilized communication channel by the recipient user (e.g., indicated in user data 144). Accordingly, channel selection program 300 sends the message to the recipient user via the identified most recently utilized communication channel.

In one embodiment, in response to channel selection program 300 sending the message to the most recently accessed communication channel of the recipient user, channel selection program 300 notifies the sender of the message (step 320). In an alternate embodiment, in response to channel selection program 300 sending the message to the most recently accessed communication channel of the recipient user, channel selection program 300 ends.

In step 308, channel selection program 300 determines a prediction of an active communication channel for the user. More specifically, in response to determining that user information repository 142 includes channel utilization data available for the recipient user (decision step 304, YES branch), channel selection program 300 determines a prediction of an active communication channel for the recipient user. In example embodiments, channel selection program 300 determines a prediction of which registered communication channel the recipient user will be accessing next or is currently utilizing. For example, channel selection program 300 determines a prediction of whether the recipient user will access client device 110 or client device 120 next. In another example scenario, channel selection program 300 determines a prediction of whether the recipient user will access a communication channel of application 114, application 116, application 124, or application 126 next.

In various embodiments of the present invention, communication tracking system 140 (e.g., utilizing channel selection program 300) derives a communication channel access pattern for users (e.g., the recipient user). Communication tracking system 140 can store the derived communication channel access pattern of the recipient user in user data 144. In an example embodiment, communication tracking system 140 utilizes historical communication channel access data for the recipient user (from user data 144) to train a time series model to learn an access pattern for the recipient user. Communication tracking system 140, and channel selection program 300, can utilize the trained time series model to predict the next probable communication channel access by the recipient user.

In another embodiment, channel selection program 300 determines that the recipient user is currently utilizing a particular communication channel. For example, channel selection program 300 determines that the recipient user is currently utilizing application 114 on client device 110. In this example, channel selection program 300 can utilize the communication channel of application 114 on client device 110 as the predicted active communication channel. In various embodiments, can identify a particular device (e.g., client device 110 or client device 120), a particular application (e.g., application 114, application 116, application 124, or application 126), or a combination of application on device (e.g., a specific instance of an application on a specific device, such as supplication 124 on client device 120), as the predicted communication channel.

In example embodiments, channel selection program 300 analyzes user data 144 to determine a probability that the recipient user will access a particular communication channel next (i.e., an active communication channel), based on the historical usage data in user data 144. In one scenario, channel selection program 300 analyzes user data 144 to identify which communication channel registered to the recipient user has the highest utilization rate at the scheduled time (e.g., current or future moment of time) of sending the message (of step 202). In this scenario, channel selection program 300 can utilize machine learning processes to mine user data 144 and determine a usage pattern of the registered communication channels of the recipient user.

In step 310, channel selection program 300 determines whether to reroute the message. In one embodiment, channel selection program 300 determines whether to reroute the message (received in step 302) to the predicted active communication channel of the recipient user (from step 308). In an example embodiment, channel selection program 300 determines whether any preferences are associated with the sending user and/or the recipient user. In an example scenario, channel selection program 300 determines whether the sender has provided instruction indicating to not reroute the message (e.g., restrict the message to a particular communication channel). In another example scenario, channel selection program 300 determines whether the recipient has associated preferences indication to not reroute the message (e.g., preferences in user data 144 indicating to not reroute messages directed to a particular communication channel, from a particular sender, during a defined time frame, based on channel security information, etc.).

In step 312, channel selection program 300 provides a notification. More specifically, in response to determining not to reroute the message (decision step 310, NO branch), channel selection program 300 provides a notification to the recipient user and/or the sending user (step 312). In one embodiment, channel selection program 300 sends a notification to the predicted active communication channel for the recipient user (from step 308). For example, channel selection program 300 sends a notification indicating that the recipient user has received a message or notification in a communication channel that the recipient user is not currently utilizing. Embodiments of the present invention can preserve the security of a message and ensure that the message is communicated through a properly secure communication channel by providing the recipient user a notification of the message in the predicted active communication channel.

In an alternate embodiment, channel selection program 300 determines that the sender-requested communication channel for the message (indicated in step 302) is the active communication channel for the recipient user (i.e., rerouting is not necessary). In this embodiment, channel selection program 300 can send the message to the recipient user in lieu of a notification.

In one embodiment, in response to channel selection program 300 providing a notification (in step 312), channel selection program 300 notifies the sender of the provided notification (step 320). In an alternate embodiment, in response to channel selection program 300 providing a notification (in step 312), channel selection program 300 ends.

In step 314, channel selection program 300 determines whether the message is compatible with the predicted communication channel. In one embodiment, channel selection program 300 determines whether the format of the message is compatible with the predicted active communication channel for the recipient user (determined in step 308). In an example embodiment, channel selection program 300 determines whether predicted active communication channel supports the content (e.g., the mode of communication) of the message.

In an example scenario, the received message (from step 302) is an audio message (e.g., a voice message) and the predicted active communication channel (from step 308) is text messaging application. In this scenario, channel selection program 300 determines that the active communication channel does not support the message format (e.g., based on a comparison of capabilities of the channel). In another scenario, the received message (from step 302) is a text message and the predicted active communication channel (from step 308) is social media messaging application. In this scenario, channel selection program 300 determines that the active communication channel does support the message format, based on the social media messaging application including text messaging capabilities.

In an additional embodiment, channel selection program 300 can take into account a situational context of the user when determining whether the communication channel is compatible. For example, channel selection program 300 determines that the recipient user is currently driving and cannot read a text message. Therefore, channel selection program 300 determines that a text message is not compatible with communication channels that the recipient user is actively capable of utilizing.

In step 316, channel selection program 300 transforms the message. More specifically, in response to determining that the message is not compatible with the predicted active communication channel (decision step 314, NO branch), channel selection program 300 transforms the message into a format that is compatible with the predicted active communication channel (step 316). In an example embodiment, channel selection program 300 determines which communication formats the predicted active communication channel supports. Channel selection program 300 can then transform the received message (from step 302) into one of the supported formats.

In an example scenario, channel selection program 300 determines that the received message (from step 302) is an audio message (e.g., a voice message) and the predicted active communication channel (from step 308) is text messaging application, which does not support the audio message. In this scenario, channel selection program 300 utilizes audio-to-text (e.g., speech-to-text mechanisms) to transform the audio message to a text message for transmission on the predicted active communication channel. In additional embodiments of the present invention, channel selection program 300 can utilize any available context transformation method (e.g., not shown but accessible to communication tracking system over network 105, such as text-to-voice, recording a live call, voice-to-text, image analytics to describe an image message, video transcript generation, etc.) to transform content of a message to a mode of communication that the predicted active communication channel of the user supports.

In step 318, channel selection program 300 sends the message to the user utilizing the predicted communication channel. More specifically, in response to determining that the message is compatible with the predicted active communication channel (decision step 314, YES branch), channel selection program 300 sends the message (received in step 302) to the recipient user utilizing the predicted active communication channel (determined in step 308) (step 318). In another embodiment, after transforming the message into a mode of communication that is compatible with the predicted active communication channel (in step 316), channel selection program 300 sends the transformed message to the user utilizing the predicted active communication channel (step 318). In an additional embodiment, channel selection program 300 can wait until a scheduled distribution time for the message to send the message (or the transformed message) to the user utilizing the predicted communication channel. In various embodiments of the present invention, channel selection program 300 sends the message to the recipient user utilizing a communication channel that the user is actively utilizing or is the predicted channel that the user will utilize next.

In step 318, channel selection program 300 notifies the sender. In one embodiment, channel selection program 300 notifies the sender (e.g., the user of client device 130) that channel selection program 300 has sent the message (received in step 302) to the recipient user. In an additional embodiment, channel selection program 300 notifies the sender that channel selection program 300 has sent the message utilizing the predicted active communication channel for the user (determined in step 308). Channel selection program 300 can also generate the notification to include an indication of which communication channel of the recipient user was utilized (e.g., based on recipient user preferences).

In other embodiments of the present invention, channel selection program 300 can provide other forms of notifications to the sending user (discussed previously with regard to steps 306 and 312 of channel selection program 300).

Embodiments of the present invention also provide a user of communication tracking system 140 with the capability to block all messages (e.g., spam message communications) from a particular sender (i.e., message origination location or identifier) on one or more communication channels associated with the user. In an example scenario, if a user (e.g., a user of client device 110 and client device 120) selects to block all communication from a sender, the communication tracking system 140 receives the block notification. Communication tracking system 140 can then send a notification to each communication channel provider that the user indicates (e.g., indicates to block the sender on all registered channels or block the sender on a subset of registered channels) to block the indicated sender from sending messages to the recipient.

Figure 4:
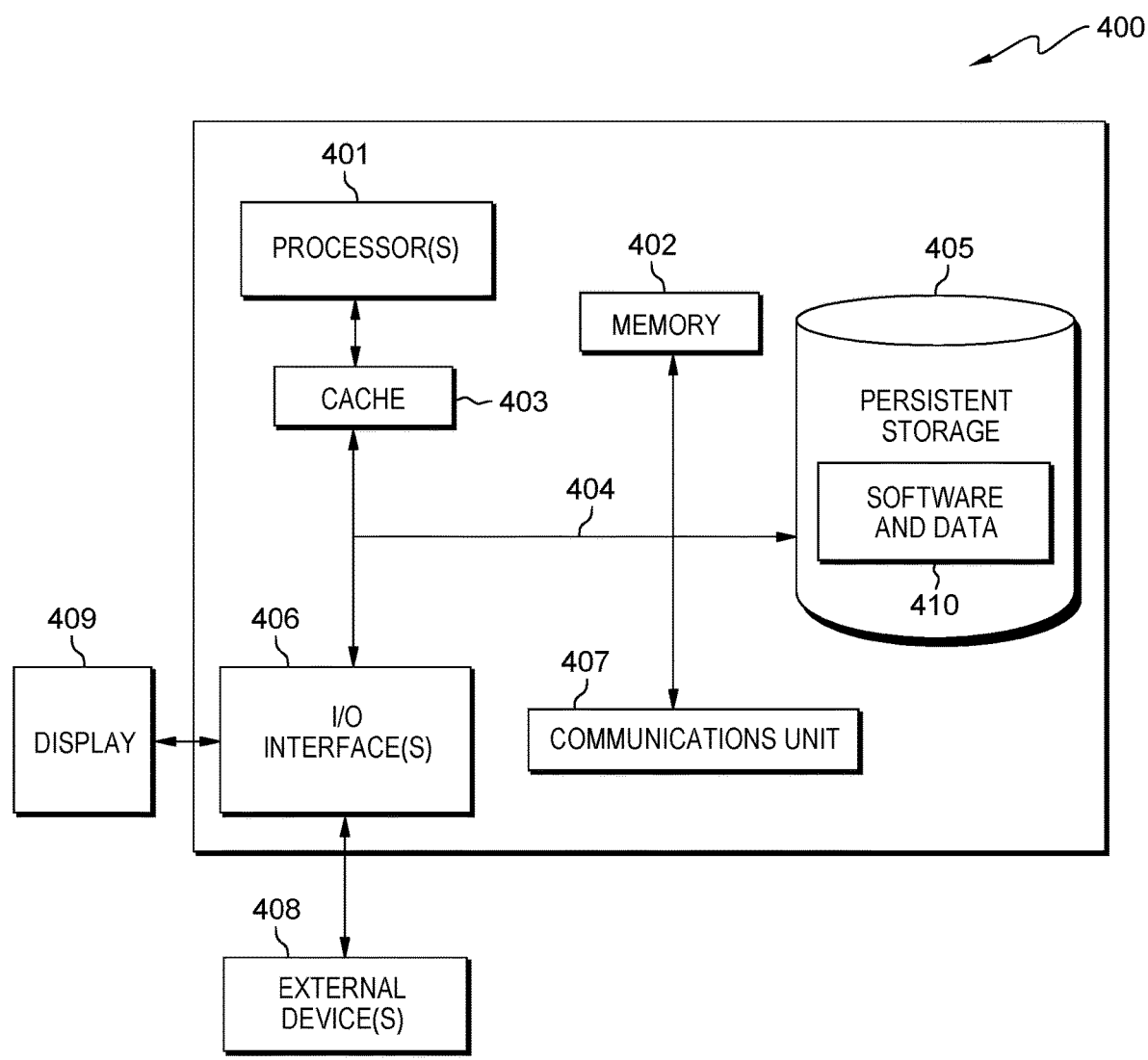
FIG. 4 depicts a block diagram of components of a computing system representative of the client devices and communication tracking system of FIG. 1, in accordance with an embodiment of the present invention.

FIG. 4 depicts computer system 400, which is representative of client device 110, client device 120, client device 130, and communication tracking system 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 110, software and data 410 includes user interface 112, application 114, and application 116. With respect to client device 120, software and data 410 includes user interface 122, application 124, and application 126. With respect to client device 130, software and data 410 includes user interface 132 and application 134. With respect to communication tracking system 140, software and data 410 includes registration program 200, channel selection program 300, user information repository 142 and user data 144.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
receiving, by one or more processors, a message for distribution to a user;
identifying, by one or more processors, historical communication channel utilization data associated with the user, the message including an indication of a scheduled distribution time for the message and an indication of a first communication channel for distribution to the user;
determining, by one or more processors, a prediction of an active communication channel for the user based on the historical communication channel utilization data associated with the user that corresponds to the scheduled distribution time for the message, wherein determining the prediction of the active communication channel further comprises:
identifying, by one or more processors, a communication channel access pattern that corresponds to the user;
determining, by one or more processors, the prediction of the active communication channel for the user based on analyzing the communication channel access pattern that corresponds to the user, wherein the predicted active communication channel corresponds to usage by the user, in the communication channel access pattern, at the scheduled distribution time for the message;
determining, by one or more processors, whether to reroute the message from the first communication channel to the predicted active communication channel of the user; and
in response to determining to reroute the message to the predicted active communication channel of the user, sending, by one or more processors, the message from the first communication channel to the user utilizing the predicted active communication channel of the user.

2. The method of claim 1, further comprising:
in response to determining that a sender of the message indicates to not reroute the message to the predicted active communication channel of the user, sending, by one or more processors, the user a notification regarding the message utilizing the predicted active communication channel of the user.

3. The method of claim 1, wherein sending the message to the user utilizing the predicted active communication channel of the user further comprises:
determining, by one or more processors, whether the predicted active communication channel supports a mode of communication of the message;
in response to determining that the predicted active communication channel does not support the mode of communication of the message, transforming, by one or more processors, content of the message into a format that the predicted active communication channel supports; and
sending, by one or more processors, the transformed message to the user utilizing the predicted active communication channel.

4. The method of claim 1, wherein determining the prediction of the active communication channel further comprises:
in response to determining that a minimum amount of historical communication channel utilization data associated with the user is not available, determining, by one or more processors, a most recently utilized communication channel by the user; and
determining, by one or more processors, that the most recently utilized communication channel is the active communication channel for the user.

5. The method of claim 1, further comprising:
sending, by one or more processors, a notification to a sender of the message that the message was sent to the user utilizing the predicted active communication channel.

6. The method of claim 1, wherein communication channels are selected from the group consisting of: a computing device, a text messaging application, an audio communication application, an image messaging application, a video messaging application, and a social media application.

7. The method of claim 1, wherein determining whether to reroute the message to the predicted active communication channel of the user further comprises:
determining, by one or more processors, whether user preferences associated with the user dictate to block routing of messages from a sender of the message.

8. The method of claim 1, wherein the message is a push notification scheduled for distribution to a plurality of users including the user.

9. The method of claim 1, wherein identifying the communication channel access pattern that corresponds to the user further comprises:
mining, by one or more processors, communication channel usage data associated with the user utilizing machine learning processes; and
determining, by one or more processors the communication channel access pattern based on usage patterns of the registered communication channels of the user.

10. The method of claim 1, wherein determining the prediction of the active communication channel for the user based on analyzing the communication channel access pattern that corresponds to the user further comprises:
determining, by one or more processors, a probability that the user will access a particular communication channel at the scheduled distribution time for the message.

11. A computer program product comprising:
one or more computer readable storage media and program instructions stored on the one or more computer readable storage media, the program instructions comprising:
program instructions to receive a message for distribution to a user;
program instructions to identify historical communication channel utilization data associated with the user, the message including an indication of a scheduled distribution time for the message and an indication of a first communication channel for distribution to the user;
program instructions to determine a prediction of an active communication channel for the user based on the historical communication channel utilization data associated with the user that corresponds to the scheduled distribution time for the message, wherein the program instructions to determine the prediction of the active communication channel further comprise program instructions to:
identify a communication channel access pattern that corresponds to the user;
determine the prediction of the active communication channel for the user based on analyzing the communication channel access pattern that corresponds to the user, wherein the predicted active communication channel corresponds to usage by the user, in the communication channel access pattern, at the scheduled distribution time for the message;

program instructions to determine whether to reroute the message from the first communication channel to the predicted active communication channel of the user; and in response to determining to reroute the message to the predicted active communication channel of the user, program instructions to send the message from the first communication channel to the user utilizing the predicted active communication channel of the user.

12. The computer program product of claim 11, further comprising program instructions, stored on the one or more computer readable storage media, to:

in response to determining that a sender of the message indicates to not reroute the message to the predicted active communication channel of the user, send the user a notification regarding the message utilizing the predicted active communication channel of the user.

13. The computer program product of claim 11, wherein the program instructions to send the message to the user utilizing the predicted active communication channel of the user further comprise program instructions to:

determine whether the predicted active communication channel supports a mode of communication of the message;

in response to determining that the predicted active communication channel does not support the mode of communication of the message, transform content of the message into a format that the predicted active communication channel supports; and send the transformed message to the user utilizing the predicted active communication channel.

14. The computer program product of claim 11, wherein the program instructions to determine the prediction of the active communication channel further comprise program instructions to:

in response to determining that a minimum amount of historical communication channel utilization data associated with the user is not available, determine a most recently utilized communication channel by the user; and determine that the most recently utilized communication channel is the active communication channel for the user.

15. The computer program product of claim 11, further comprising program instructions, stored on the one or more computer readable storage media, to:

send a notification to a sender of the message that the message was sent to the user utilizing the predicted active communication channel.

16. A computer system comprising:

one or more computer processors;

one or more computer readable storage media; and program instructions stored on the computer readable storage media for execution by at least one of the one or more processors, the program instructions comprising:

program instructions to receive a message for distribution to a user;

program instructions to identify historical communication channel utilization data associated with the user, the message including an indication of a scheduled distribution time for the message and an indication of a first communication channel for distribution to the user;

program instructions to determine a prediction of an active communication channel for the user based on the historical communication channel utilization data associated with the user that corresponds to the scheduled distribution time for the message, wherein the program instructions to determine the prediction of the active communication channel further comprise program instructions to:

identify a communication channel access pattern that corresponds to the user;

determine the prediction of the active communication channel for the user based on analyzing the communication channel access pattern that corresponds to the user, wherein the predicted active communication channel corresponds to usage by the user, in the communication channel access pattern, at the scheduled distribution time for the message;

program instructions to determine whether to reroute the message from the first communication channel to the predicted active communication channel of the user; and in response to determining to reroute the message to the predicted active communication channel of the user, program instructions to send the message from the first communication channel to the user utilizing the predicted active communication channel of the user.

17. The computer system of claim 16, further comprising program instructions, stored on the computer readable storage media for execution by at least one of the one or more processors, to:

in response to determining that a sender of the message indicates to not reroute the message to the predicted active communication channel of the user, send the user a notification regarding the message utilizing the predicted active communication channel of the user.

18. The computer system of claim 16, wherein the program instructions to send the message to the user utilizing the predicted active communication channel of the user further comprise program instructions to:

determine whether the predicted active communication channel supports a mode of communication of the message;

in response to determining that the predicted active communication channel does not support the mode of communication of the message, transform content of the message into a format that the predicted active communication channel supports; and send the transformed message to the user utilizing the predicted active communication channel.

19. The computer system of claim 16, wherein the program instructions to determine the prediction of the active communication channel further comprise program instructions to:

in response to determining that a minimum amount of historical communication channel utilization data associated with the user is not available, determine a most recently utilized communication channel by the user; and determine that the most recently utilized communication channel is the active communication channel for the user.

20. The computer system of claim 16, further comprising program instructions, stored on the computer readable storage media for execution by at least one of the one or more processors, to:

send a notification to a sender of the message that the message was sent to the user utilizing the predicted active communication channel.

* * * * *